232-101 CROSS REFERENCE EXAMINE

United States Patent Office 3,251,777
Patented May 17, 1966

3,251,777

POWDERLESS ETCHING BATH

John A. Easley, Midland, Mich., assignor to The Dow Chemical Company, Midland, Mich., a corporation of Delaware No Drawing. Filed Mar. 2, 1964, Ser. No. 348,831
6 Claims. (Cl. 252—79.4)

This patent application is a continuation-in-part of U.S. patent application Serial No. 819,823, filed June 12, 1959, now abandoned.

This invention relates to an improved method and bath for etching photoengraving plates and is more particularly concerned with an improved filming agent for powderless etching baths as employed in the production of metal photoengraving plates, name plates, templates, patterns and the like.

In the conventional method of making such objects as, for example, photoengraving plates, a flat or cylindrical plate of an acid-soluble metal such as magnesium, zinc or one of their alloys is coated with a light-sensitive coating or "enamel." This coated surface is exposed to light through a negative having an image thereon so as to produce an image on the coating. Next, the exposed surface is developed forming an acid-resistant coating in the form of the image produced by the exposure. This acid-resistant coating is generally further hardened by heating and the final acid-resistant image is called the "resist." The image-bearing surface of the plate is then subjected to etching by an acid to produce an image in relief.

In carrying out the etching process, techniques are employed to reduce lateral etching which undercuts the resist and/or relief side walls causing a weakening, distortion or complete loss of the image. A common method in the art for minimizing lateral etching consists of powdering the sides of the relief with an acid-resistant etching powder. This is a difficult and time-consuming operation which must be repeated a number of times for each plate.

Recent inventions have introduced and expanded powderless etching techniques. Inventions of this nature are disclosed in United States 2,640,765, 2,640,767, 2,828,194 and 2,846,294. It is to the further development of the powderless etching art that the present invention is directed.

More particularly, one facet of powderless etching to which this invention is directed is that of improving etching bath chemical stability. An essential ingredient of the etching bath is a strong acid such as nitric acid which performs the function of etching or dissolving the metal in unprotected areas of the plate. Other bath ingredients include a water-immiscible organic fluid and certain filming agents. The combination of the latter two bath ingredients functions to minimize lateral etching. It is necessary in carrying out the process that all of these ingredients be contained in the same bath. Thus, to some degree, chemical interaction between the etching acid and the other bath components may be a source of bath chemical instability which is broadly defined as the inability of the bath to reproduce uniform results on consecutive plates over a period of time. The ingredients of the bath of the instant invention keep this instability down to a minimum.

Another facet of powderless etching to which this invention is directed is that of improving the filming tendency of the etching bath. Upon application of the bath, it is believed that a polar segment of a hydrophobic-hydrophilic filming agent molecule attaches to the exposed metal surface. The hydrophobic part of this same molecule having affinity for the molecules of the water-immiscible acid-stable organic fluid attracts such molecules to it thereby perfecting an acid-resistant film. However, it is a requirement of this combination of filming agent and water-immiscible organic fluid that it have selective filming tendencies, i.e., an acid-resistant film is formed on relief side walls while in adjacent non-resist areas such a film does not occur or if it does occur, it does not remain under the conditions of the bath's application. Also, filming selectivity is further complicated when it is applied to a photoengraving plate by the fact that there may be different kinds of image areas which require etching to different depths as, for example, in open line areas which usually require depths of etch of about 0.02 inch and 65 line screen halftone areas in the same plate which need uniform depths of about 0.005 inch in the highlight areas.

In etching printing plates of a magnesium base alloy, that is, alloys containing at least 80 percent of magnesium, bearing a resist of printed matter such as newspaper copy, with one of the etching bath formulations within the purview of U.S. Patent 2,846,294, viz., an etching bath made up of dilute nitric acid, a wetting agent of tetradecyl sulfate and a water-immiscible liquid petroleum fraction boiling in the ring from 70° to 390°, a definite shortcoming exists. This shortcoming is that the etching action will sometimes cease in the small bare areas of the plate encircled by a line of resist, as in the letters a, A, b, B, d, D, e, g, o, p, P and Q, which may be referred to as closed letters, and in the narrow spaces between adjacent portions of the resist, after only a moderate depth of etch is produced. This holds true in spite of continued exposure of the plate to the etching bath which will continue to etch the larger areas of the bare portions of the plate, that is, the areas around the letters, leaving them in relief. The depth of the etch produced in the areas encircled by a line of resist before the etching action comes to a stop will be more or less directly proportional to the size of the encircled areas. That is to say, the smaller the bare encircled area subjected to the etching action of the bath, the sooner the etching action ceases. In some instances, the cessation of the etching action of the bath within the encircled areas results in an insufficient depth of etch being produced in these areas. This is the case even though within the same time of exposure to the bath, an adequate etching depth is readily obtained in the adjacent larger areas, namely, those beyond the immediate vicinity of the letters, where the etching action does not become prematurely arrested or retarded. Further research has resulted in the discovery that by using a filming agent such as that defined in the instant invention, the etching action of the bath is caused to continue in areas in which the etching action would otherwise cease. As a result, a wider range of letter sizes can be clearly etched in relief to a sufficient depth within and adjacent to resist encircled areas for printing purposes.

A principal object of this invention is to provide a relatively stable filming agent which is soluble in the etch bath in the proportions used and method for its use in powderless etching baths. It is a further object to provide a chemically stable etching bath capable of producing uniform and proper depths of etch in all parts of combination photoengraving plates. Still another object is to provide a powderless etching bath capable of producing desired depths of etch in name plates, metal patterns and templates. Another object of the present invention is to provide a powderless etching bath which may be intermittently used over a period of several days. An additional object is to provide a powderless etching bath capable of use in a single continuous application ("one shot" baths) using combination-type photoengraving plates. Other objects will become apparent hereinafter.

Such objects can be accomplished by an etching bath comprising (A) nitric acid; (B) water-immiscible organic fluid substantially stable in the presence of dilute nitric acid; (C) the acid form of a filming agent (agent being defined as a compound or a blend of compounds) which is soluble in both the water-immiscible organic fluid and in the bath in the proportions used, as may be characterized by the formula $$R_n\left[Ar-O-Ar\right](SO_3H)_m$$

wherein the enclosed molecular nucleus represents a non-halogenated diaryloxide in which Ar is (1) a monocyclic aromatic radical of the benzene series, and (2) consists of at least two of the elements selected from the group consisting of carbon, hydrogen and oxygen; R is a hydrophobic substituent containing from 14 to 36 carbon atoms, inclusive, in continuous carbon-carbon bonds; *n* is an integer from 1 to 3 and *m* is an integer from 1 to 2, if $m=1$, then the total hydrophobic substitutent contains from 14 to 20 carbon atoms, if $m=2$, then the total hydrophobic substituent contains 20 to 36 carbon atoms; and (D) water.

These bath components and the amounts required are described in more detail below. Since etching baths are usually made up to a stated volume, the amounts of bath ingredient for convenience are expressed in grams per liter of bath. Unless otherwise specified, amounts of nitric acid are on the basis of 100 percent nitric acid.

The acid ingredient is generally nitric acid, although mixtures of nitric acid and small amounts of sulfuric, hydrochloric or acetic may be operable in some baths. Operable amounts of nitric acid range from 30 to 200 grams per liter of bath, but a preferred range is from 50 to 150 grams per liter of bath. A desired range is 60 to 140 grams per liter of bath.

A second ingredient is an organic water-immiscible fluid which may be a single compound or blend of such compounds. Required properties of this additive are that it be substantially stable in the presence of dilute nitric acid, at bath temperatures, and that it have some solvency for the filming agent. Substantially stable is defined as the non-occurrence of deterioration, within a reasonable time period, due to the presence of dilute nitric acid which significantly alters the function of the organic water-immiscible component within the bath in an unfavorable manner. Also, it is essential that this additive is a liquid at bath temperatures. Suitable organic materials which can be used individually or in combination are hydrocarbon aromatics, aliphatics and naphthenics boiling from 90° to 390° C. as, for example, ligroin, kerosene, gas oils, diethylbenzenes, tetramethylbenzenes, diisopropylbenzenes and dodecylbenzene. Other examples of water-immiscible fluids include turpentine, monochloroethylbenzene, ethylbutyl ketone, isophorone, methylhexyl ketone, d-limonene, diisodecyl phthalate, dicapryladipate and the like. Generally, it may be said that water-immiscible esters, ketones, terpenes, ethers, aliphatic, naphthenic and aromatic hydrocarbons are operable. Certain commercial solvents also serve very effectively as this component of the bath. An example is a commercial aromatic solvent under a trade name of Penola H.A.N. which contains 84 percent aromatics, has a flash point of 140° F., an aniline point of minus 2° F. and a distillation temperature range at 760 mm. Hg: initial boiling point of 340° F., 50 percent distilled at 446° F. and dry point at 532° F. Another commercial aromatic solvent employed has the trade name Solvesso 150 which is a mixture of approximately 90 percent alkyl benzenes, 2 percent naphthalene and 8 percent naphthenes. It has a flash point of 150° F., an aniline point of minus 18° F. and a distillation temperature range at 760 mm. Hg: initial boiling point of 303° F., 50 percent distilled at 378° F. and dry point at 415° F. The amounts of the water-immiscible organic fluid employed may range from 3 to 150 grams per liter of bath but a preferred range is from 5 to 100 grams per liter of bath. A desired range is 10 to 60 grams per liter of bath.

A third ingredient is the acid form of an organic filming agent (agent being defined as a compound or blend of compounds) as may be characterized by the formula $$R_n\left[Ar-O-Ar\right](SO_3H)_m$$

wherein the enclosed molecular nucleus represents a non-halogenated diaryloxide in which Ar is (1) a monocyclic aromatic radical of the benzene series, and (2) consists of at least two of the elements selected from the group consisting of carbon, hydrogen and oxygen; R is a hydrophobic substituent containing from 14 to 36 carbon atoms, inclusive, in continuous carbon-carbon bonds; *n* is an integer from 1 to 3 and *m* is an integer from 1 to 2, if $m=1$, then the total hydrophobic substituent contains from 14 to 20 carbon atoms, if $m=2$, then the total hydrophobic substituent contains 20 to 36 carbon atoms.

It is to be understood that the hydrophobic groups may be aryl, cycloaliphatic or aliphatic and that "continuous carbon-carbon bonds" refers to carbon to carbon linkages contained in aromatic rings as well as aliphatic straight chain molecules. For example, hexylbenzene will fall within this definition.

It is unimportant as to what hydrogen displaceable ion said filming agent contains prior to its being converted into the acid form in the bath. Suitable materials that said filming agent can contain as its hydrogen displaceable ion in addition to hydrogen itself are the alkali metals, alkaline earth metals (defined as including magnesium), ammonium and substituted ammonium radicals. However, heavy metal salts such as salts of mercury or lead are undesirable. Furthermore, the sulfonic acid radicals or salts thereof may be substituted on any of the hydrophobic groups. However, it may be predicted that they will be present on an aromatic ring if there is such a ring present or at points in aliphatic chains that were unsaturated initially.

A critical overall solubility limitation on the filming agent of this invention is that it must, first of all, be soluble in the bath and secondly, soluble in the water-immiscible organic fluid and thirdly, partially soluble (at least 0.01 percent of the total solute) in the aqueous acid solution.

The foregoing sulfonic surfactants also have a high stability in the presence of strong acids and are to be distinguished from the sulfated compounds of U.S. Patents 2,828,194 and 2,846,294. The manner of preparation of the sulfonates, the chemical bonding and, as to be expected, the chemical properties are critically different. Illustrative of the differences in the chemical bonds are the following equations which indicate a carbon to sulfur bond for the sulfonates and a carbon to oxygen bond for the carbon sulfates:

$$R-H + HOSO_3H \longrightarrow \underset{\text{(sulfonate)}}{R-SO_3H + H_2O}$$

$$R-OH + HOSO_3H \longrightarrow \underset{\text{(sulfate)}}{R-OSO_3H + H_2O}$$

The amounts of the filming agent employed can range from 0.2 to 20 grams per liter of bath, but a preferred range is from 1 to 15 grams per liter of bath. A desired range is from 2 to 10 grams per liter of bath.

An example of a non-halogenated diaryloxide as disclosed in the instant invention is sodium dioctyl diphenyloxide monosulfonate. Another example of such a non-halogenated diaryloxide suitable for use as a film-forming agent herein is disodium didodecyl diphenyloxide disulfonate.

The remaining essential bath component is water which makes up the balance of the bath but it should be understood that other materials may be present in the bath since it is not practical to employ the foregoing components in a pure state. Also, additional materials may be added to enhance a particular effect.

In the practice of the present invention, it has been found desirable to impinge the bath upon the surface to be etched as by spraying or by splashing. The bath selectively forms an acid-resistant film on the plate thereby allowing etching in resist-free areas normal to the surface of the metal plate while, at the same time, protecting the resist and the relief side walls from lateral etching.

In formulating the etching bath, it has been found to be a general rule that if the concentration of the nitric acid is increased within the aforementioned limitations, it is necessary to also increase the proportion of filming agent employed. However, due to the fact of bath depletion as the etching process is carried out, amounts of components are designated in terms of initial concentrations.

Suitable metals which may be etched by the process of this invention include zinc, zinc base alloys, magnesium and magnesium base alloys, all of which are substantially homogeneous metals suitable for photoengraving or the like. A zinc or magnesium base alloy is defined as having at least 80 percent of the base component. The average bath temperature may be within a range from 40° to 120° F. but a preferred range is from 60° to 90° F.

A preferred embodiment of this invention comprises nitric acid in an amount of about 60 to 130 grams per liter of bath, a water-immiscible organic fluid in an amount of from about 10 to 70 grams per liter of bath and the acid form of a filming agent which is soluble in the water-immiscible organic fluid and in the bath in the proportion used in an amount from about 1 to 7 grams per liter of bath. The remainder of the mixture is water. To carry out the etching process, it is preferred to employ an etching machine of the type disclosed in U.S. Patent 2,669,048, issued February 16, 1954. In this "Dowetch" machine, rotating elongated paddles intermittently splash the etching bath upwardly against the image-bearing side of the object being etched. The splashing action of the paddles also serves to keep the bath in a homogeneous state. A bath of this invention applied in the foregoing manner will produce a good combination photo-engraving plate having depths of etch in open line areas of about 0.02 inch and up to about 0.0065 inch in 65 line screen halftone areas with minimal amounts of lateral etching in all areas. Also, comparable results are achieved when this bath is used to etch name plates and metal patterns. In order to produce satisfactory results, etch factors in open line areas can be no lower than 10, but should be in a range from about 15 to 50. "Etch factor," as used in the specification, is defined as the ratio of the depths of etch adjacent to a line of resist divded by one-half of the loss in width of metal immediately beneath the resist. It is obviously desirable to have as high etch factors as possible for faithful reproduction of the image in relief. However, it should be noted that the etch factor can be sensitive to changes in depth and, therefore, it should be considered as only one rough approximation of plate quality.

The following examples are intended to be merely illustrative of the invention and should not be construed as limitations on the scope of the invention.

*Example 1*

A powderless etching bath of 6 liters was prepared in a miniature "Dowetch" machine by adding 1020 grams of 42° Baumé nitric acid, 240 grams of diethylbenzene (a mixture of the isomers) and 42 grams of sodium dioctyl diphenyloxide monosulfonate. The remainder of the bath was water. The addition of the filming agent was conveniently accomplished by first dissolving or colloidally dispersing it in a small amount of water and then adding the resulting solution to the bath. Bath temperature was adjusted to about room temperature, approximately 70° F. A plate approximately 5" x 5" x .064" of magnesium base alloy containing 3 percent aluminum, 1 percent zinc and trace amounts of impurities having a polyvinyl alcohol resist thereon was descummed by brushing the surface with dilute nitric acid until the surface was bright. The plate was then placed in the machine, the paddles turned on and etching allowed to continue for 6 minutes. The resulting plate had a depth of etch in open line areas of about 0.01 inch and in 65 line screen halftone areas, a depth of about 0.005 inch. The general appearance of the plate was very good and the etch factor in the open line areas was approximately 15.

*Example 2*

In a manner similar to that of the foregoing example, a 6 liter bath was prepared from about 852 grams of 42° Baumé nitric acid, 300 grams of Solvesso 150 and 25 grams of disodium didodecyl diphenyloxide disulfonate. Water constituted the remainder of the bath. The actual acid concentration used in the etching process was lower than that indicated above due to the etching of five plates in this bath prior to the run of this example. A plate similar to that of the foregoing example except that its dimensions were approximately 2" x 3.25" x 0.064" having a resist thereon was subjected to the etching action of the bath in a miniature "Dowetch" machine for 6 minutes. Bath temperature during the etching process was about 75° F. A depth of etch in the open line areas was about 0.009 inch and in 65 line screen halftone areas, the depths of etch were about 0.005 inch. The etch factor in the open line areas was approximately 15.

In a manner similar to that of the foregoing example, the following filming agents may be substituted for the aforementioned specific filming agent accomplishing thereby comparable results. Examples of these filming agents are the sulfonic acids or salts of Pentadecyl diphenyl ethers,
Eicosyl diphenyl ethers,
Decylpentadecyl diphenyl ethers,
Didecyl diphenyl ethers,
Dodecylpentadecyl ethers,
Pentadecyloctadecyl ethers,
Decyldodecyl diphenyl ethers,
Pentadecyl para-hydroxy diphenyl ethers,
Eicosyl meta,para-dihydroxy diphenyl ethers,
Decyldodecyl ortho,para-dihydroxy diphenyl ethers,
Decylpentadecyl meta-hydroxy diphenyl ethers,
Pentadecyloctadecyl ortho-hydroxy diphenyl ethers,
Decylphenyl diphenyl ethers, didodecylphenyl diphenyl ethers and the like.

Also, in a similar manner to that of the foregoing examples, other objects such as name plates, templates and metal patterns may be etched with the powderless etching baths of this invention achieving thereby a quality of etch comparable to that shown for photoengraving plates shown above.

Various modifications may be made in the etching bath additives of this invention and the method of applying the bath without departing from the scope of this invention, and it is to be understood that I limit myself only as defined in the appended claims as read in the light of the specification.

What is claimed is:

1. An etching bath consisting essentially of (A) 30 to 200 grams per liter of bath of nitric acid; (B) 3 to 150 grams per liter of bath of a water-immiscible organic fluid substantially stable in the presence of dilute nitric acid; (C) 1 to 15 grams per liter of bath of the acid form of a filming agent which is soluble in both the water-immiscible organic fluid and in the bath in the proportions used, characterized by the formula $$R_n\left[Ar-O-Ar\right](SO_3H)_m$$

wherein the enclosed molecular nucleus represents a non-halogenated diaryloxide in which Ar is a monocyclic aromatic radical of the benzene series consisting of at least two of the elements selected from the group consisting of carbon hydrogen and oxygen; R is a hydrophobic substituent containing from 14 to 36 carbon atoms, inclusive, in continuous carbon-carbon bonds; $n$ is an integer from 1 to 3, inclusive; and $m$ is an integer from 1 to 2 with further concurrent limitation that when $m=1$, the total hydrophobic substituent contains from 14 to 20 carbon atoms and when $m=2$, the total hydrophobic substituent contains from 20 to 36 carbon atoms; and the balance as (D) water.

2. The etching bath in accordance with claim 1 wherein said filming agent is the acid form of sodium dioctyl diphenyloxide monosulfonate.

3. The etching bath in accordance with claim 1 wherein said filming agent is the acid form of disodium didodecyl diphenyloxide disulfonate.

4. A method for etching photoengraving combination acid-soluble metal plates selected from the group consisting of zinc, zinc base alloys, magnesium and magnesium base alloys which comprises repeatedly impinging an etching bath upon the metal surface to be etched as by splashing, such bath consisting essentially of (A) 30 to 200 grams per liter of bath of nitric acid; (B) 3 to 150 grams per liter of bath of a water-immiscible organic fluid substantially stable in the presence of dilute nitric acid; (C) 1 to 15 grams per liter of bath of the acid form of a filming agent which is soluble in both the water-immiscible organic fluid and in the bath in the proportions used, characterized by the formula $$R_n-\left[\text{Ar}-\text{O}-\text{Ar}\right]-(SO_3H)_m$$

wherein the enclosed molecular nucleus represents a nonhalogenated diaryloxide in which Ar is a monocyclic aromatic radical of the benzene series consisting of at least two of the elements selected from the group consisting of carbon, hydrogen and oxygen; R is a hydrophobic substituent containing from 14 to 36 carbon atoms, inclusive, in continuous carbon-carbon bonds; $n$ is an integer from 1 to 3, inclusive; and $m$ is an integer from 1 to 2 with further concurrent limitation that when $m=1$, the total hydrophobic substituent contains from 14 to 20 carbon atoms and when $m=2$, the total hydrophobic substituent contains from 20 to 36 carbon atoms; and the balance as (D) water.

5. The method in accordance with claim 4 wherein the filming agent is the acid form of sodium dioctyl diphenyloxide monosulfonate.

6. The method in accordance with claim 4 wherein the filming agent is the acid form of disodium didodecyl diphenyloxide disulfonate.

References Cited by the Examiner

UNITED STATES PATENTS

| | | | |
|---|---|---|---|
| 2,846,294 | 8/1958 | Patterson et al. | 252—79.4 |
| 2,854,477 | 9/1958 | Steinhaurer | 260—512 |
| 2,990,375 | 6/1961 | Steinhaurer | 260—512 |

JULIUS GREENWALD, *Primary Examiner.*

M. WEINBLATT, *Assistant Examiner.*